United States Patent Office 2,977,988
Patented Apr. 4, 1961

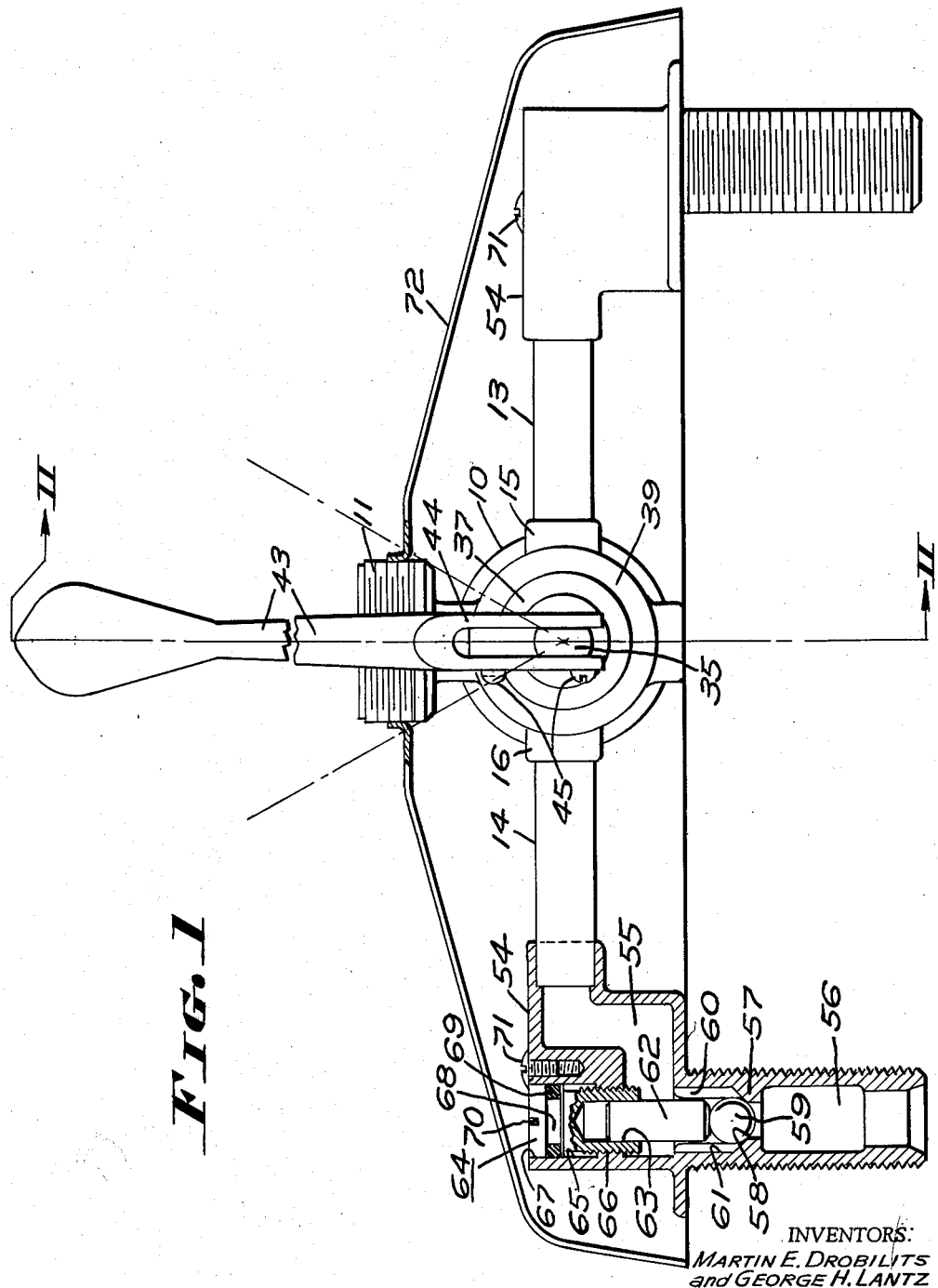

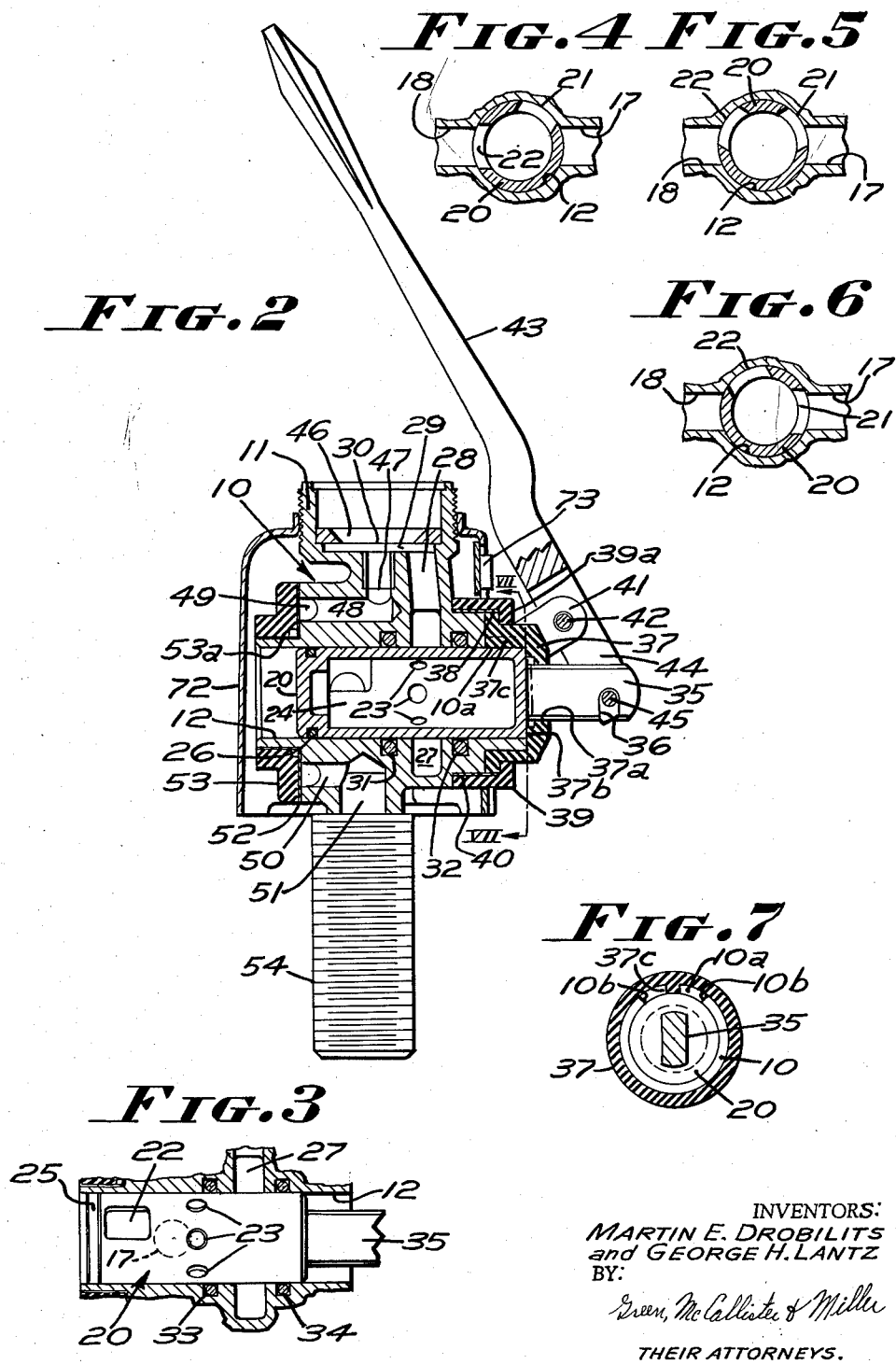

2,977,988
SINGLE LEVER CONTROL FAUCET

Martin E. Drobilits and George H. Lantz, Morgantown, W. Va., assignors to Sterling Faucet Company, Morgantown, W. Va., a corporation of West Virginia Filed Sept. 29, 1958, Ser. No. 763,950

11 Claims. (Cl. 137—625.17)

This invention relates to a mixing faucet operated by a single control lever, and more particularly to a single lever faucet for controlling both the volume and temperature of water dispensed therefrom.

Known types of single lever control faucets have not been completely satisfactory since they have been constructed with the common type of valve head and valve seat arrangement, wherein the valve head is urged into a sealing engagement with the valve seat in order to seal-off fluid flow through the faucet. When this known type of valve construction is utilized, the valve head is inherently urged and maintained against the valve seat by means of the fluid pressure entering the faucet. The valve system is, therefore, of an unbalanced mechanical arrangement wherein it is necessary to first overcome the fluid pressure within the faucet body in order to open the valve.

A further disadvantage of the known type of single lever control faucet construction is the inherent wearing of operating surfaces between moving parts, due to metal-to-metal contact. In the past, the seating valve and the mixing valve have been maintained in axial alignment within the faucet body with a metal-to-metal sliding contact guide surface. This type of arrangement is unsatisfactory, due to the excessive wear on the mixing valve and faucet body caused by the frictional engagement of the metal surfaces.

An object of our invention has been to devise a new and simplified single lever control faucet construction which alleviates the above-noted disadvantages.

Another object of our invention has been to provide a new and improved single lever faucet construction having a hydrostatically-balanced sealing valve to close-off fluid flow through the faucet.

An additional object of our invention has been to provide a new and improved faucet construction having a floating mixing valve which has no metal-to-metal contact with the body member in which it is enclosed.

An additional object of our invention has been to provide a combination sealing valve and mixing valve which is hydrostatically-balanced within the faucet body.

These and other objects of our invention will be apparent to those skilled in the art from the following description and drawings in which:

Figure 1 is a back elevation, partly in section, of an embodiment of our faucet construction;

Figure 2 is a side elevation in section taken along line II—II of Figure 1 and showing the hydrostatically-balanced valve chamber in an open position;

Figure 3 is a fragmental portion of the faucet body member showing the hydrostatically-balanced valve chamber in a closed position;

Figure 4 is a somewhat diagrammatic illustration in section showing the position of the valve chamber when cold water is dispensed from the faucet;

Figure 5 is similar to Figure 4, but showing the position of the valve chamber when equal amounts of both hot and cold water are dispensed from the faucet;

Figure 6 is similar to Figure 4, but showing the position of the chamber when hot water is dispensed from the faucet; and Figure 7 is a cross-sectional view in elevation taken along lines VII—VII of Figure 2 showing rotational limit stops for the control handle.

Referring now to the drawings, the faucet is composed of a body member 10 having a nozzle or spout mounting portion 11 adjacent the top thereof for a discharge spout (not shown). A longitudinally-extending horizontal bore 12 passes transversely through the body member. The body member 10 is connected to a source of hot and cold water by means of hot water connecting pipe 13 and cold water connecting pipe 14 which are coupled to the body member by coupling portions 15 and 16, respectively. The hot water connecting pipe 13 radially communicates with the longitudinally-extending bore 12 by means of bore 17 formed in a side of the body member 10. The cold water connecting pipe also communicates radially with the longitudinally-extending bore 12 by means of a bore 18 in axial alignment with bore 17 and formed in an opposite side of the body member 10 from the bore 17. That is to say, bores 17 and 18 are in axial alignment with respect to the axial extent of bore 12. It is to be understood, of course, that the hot and cold water connecting pipes 13 and 14 are set forth merely for purposes of illustration, and they may be reversed so that pipe 13 is connected to a source of cold water, and pipe 14 is connected to a source of hot water, if desired.

A hollow plunger or valve cylinder 20 is positioned within the bore 12 for both rotatable and reciprocable movement therein. The valve cylinder 20 is provided with inlet ports 21 and 22 which are in axial alignment with respect to the axial extent of the cylinder 20 and which may communicate with bores 17 and 18, respectively, either singularly or simultaneously, depending upon the rotational orientation of the valve cylinder 20. The inlet ports 21 and 22 are arcuately spaced-apart and formed radially through the cylindrical side wall of the plunger 20 adjacent the forward end or nose thereof. A plurality of circumferentially or arcuately spaced-apart outlet ports 23 are formed radially through the cylindrical side wall of the plunger 20 intermediate its ends. The hollow plunger or cylindrical valve 20 is provided with an oblong chamber or hollow portion 24 which communicates with both the inlet ports 21 and 22 and the outlet ports 23.

An annular recess 25 is formed about the outer periphery of the valve cylinder 20 adjacent its forward end. A replaceable O-ring 26 of resilient material is seated within the recess 25, and forms an annular fluid seal between the valve cylinder 20 and wall portions of bore 12. A vertically-extending annular mixing chamber 27 is formed within the body member 10 and communicates with the bore 12. Passageways 28 and 29 connect the mixing chamber 27 with discharge orifice 30 which leads to the discharge spout.

A pair of annular recesses 31 and 32 are formed within the body member 10 on opposite sides of the mixing chamber 27 and in communication with the bore 12. A pair of replaceable O-rings 33 and 34 are positioned within the recesses 31 and 32, respectively, to form a sealing engagement with the outer cylindrical surface of the plunger or valve cylinder 20. The cylinder 20 does not have a metal-to-metal contact with the walls of bore 12, but rather, is provided with approximately .002 inch clearance therebetween. The cylinder 20 therefore is, in effect, a floating cylinder within the bore 12, since it is out of contact with wall portions of the bore 12 and is supported in sealing contact with the walls of the bore 12 by O-rings 26, 33, and 34.

The spatial relation maintained between the cylinder 20 and the walls of bore 12 by replaceable O-rings 26, 33 and 34 prevents a frictional metal-to-metal sliding engagement between the cylinder and bore walls. This erosion of the operating surfaces, which is prevalent in known types of single lever control faucets resulting in a wearing away of the cylinder and bore walls, is eliminated by our arrangement of flexible O-rings made of resilient material. The precision cut bore and cylinder never have to be replaced, due to becoming worn, and the O-rings, being of a flexible resilient material, have an extensive life period, although they are easily and inexpensively replaceable, if necessary.

A horizontal projection or bar 35 extends outwardly and rearwardly from the plunger or valve cylinder 20. The bar 35 is provided with a downwardly-open slot 36. A rotatable cap 37 having an opening 37a to permit the bar 35 to extend therethrough, is secured to the back of the body member 10 by means of a retainer nut 39 threaded to the body 10 at threaded portion 40. The retainer nut 39 has a radially-inwardly extending flange portion 39a at its back end which overlies an annular, radially-outwardly extending flange portion 38 formed on the cap 37. The cap 37 has a shoulder portion 37b which forms a stop abutment for the back end of the valve cylinder 20, as shown in Figure 2, and limits the backward movement thereof.

The rotatable cap 37 has an inclined projection 41 having a bore 42 therethrough. A handle 43 has a bifurcated end portion 44 which overlies the projections 35 and 41. The handle is secured to both the projections 35 and 41 by means of bolts or pins 45 passing through slot 36 and bore 42, respectively. It thus can be seen that when the handle 43 is rotated, both the cap 37 and the plunger 20 will also be rotated. When the handle is moved backwardly and forwardly, the plunger 20 will be moved forwardly and backwardly, respectively, since the bolt or pin 45 within the bore 42 will act as a fixed pivot, and the bolt or pin 45 within the slot 36 will act as a moving or sliding pivot. The plunger or valve cylinder 20 is limited, in its forward movement, by bifurcated end portions 44 contacting the back of cap 37. The pivots are positioned so that O-ring 26 will remain within bore 12 when the plunger 20 is in its forwardmost position, as shown in Figure 3.

The discharge orifice 30 is provided with a seat adapter 46 for a spout diverter (not shown). Passageways 47 and 48 communicate with an annular passageway 49 which in turn communicates with passageway 50. Passageway 50 is in communication with recess 51 which is adapted to receive a hose attachment fitting. Water may therefore be diverted from the spout attached to the nozzle or spout mounting portion 11, downwardly through the passageways 47, 48, 49, and 50, into the recess 51 and is discharged through a suitable attachment, such as a spray hose connected thereto. The annular passageway 49 is in communication with a forward edge of the body member 10. An annular fiber washer 52 is positioned over the forward edge of the body member 10 to seal-off the annular passageway 49. The washer 52 is held in a sealing position by means of end nut 53 threaded to the body member 10 at threaded portion 53a.

Both the hot and cold water connecting pipes 13 and 14, respectively, are connected to shanks 54. Each shank 54 has an outlet passageway 55 and an inlet passageway 56. A necked-down portion 57 joins the passageways 55 and 56. A valve seat 58 is formed within the necked-down portion 57. A ball valve 59 is positioned within each shank 54 to seat upon the valve seat 58. The ball valve 59 is retained within a series of lands 60 and grooves 61 formed on an inner wall portion of each shank 54. The lands and grooves guide the ball valve in its upward and downward movement and eliminate damage to or chattering of the ball during this movement.

A push rod 62 is positioned within each shank 54, so that the bottom end thereof will rest on the ball valve 59. The top end of the push rod 62 is freely slidable within a bore 63 formed in shank plug 64. The shank plug 64 is positioned within a vertically-extending bore 65 formed within each shank 54. The bore 65 has a threaded portion 66 adjacent its lower end, and a smooth bore portion 67 adjacent its upper end. The shank plug 64 is threaded into the threaded portion 66. Plug 64 is provided with an annular recess 68 adjacent its upper end. A replaceable O-ring 69 is positioned within the recess 68 and provides a fluid-sealing engagement between the plug 64 and wall portions of the bore 65. The head of the plug 64 is provided with a slot 70, so that the plug may be vertically adjusted within the bore 65 by means of a screwdriver. A safety screw 71, having a wide head which overlaps the top of the plug 64, is threaded into the top of the shank 54 adjacent the bore 65. The safety screw 71 limits the upward extent to which the plug 64 may be screwed, so that the plug will not inadvertently be unscrewed from the shank. A cover 72 having a removable back plate 73 encloses the faucet construction.

It thus can be seen from the foregoing construction that under normal operating conditions, hot water entering from conduit 13 and bore 17 and cold water entering from conduit 14 and bore 18 will always be in communication with the bore 12. Since the cylindrical valve 20 is positioned within the bore 12 with a clearance of approximately two thousandths of an inch therebetween, the water entering the bore 12 from bores 17 and 18 will always be in communication with the chamber 24 through inlet ports 21 and 22. When the valve is in the open position, as shown in Figure 2, fluid entering chamber 24 from bores 17 and 18 is permitted to flow radially-outwardly from the chamber through the radially-extending outlet ports 23, into the mixing chamber 27, and out through the spout mounted on portion 11. In this open position, the water entering the bore 12 between the walls of the bore and the plunger 20, will be limited in its travel within the bore between fluid-sealing O-rings 26 and 34.

When the cylindrical valve is in a closed position, as shown in Figure 3, fluid within the chamber 24 cannot escape through the outlet ports 23, since they are positioned between the fluid-sealing O-rings 26 and 33 within bore 12. The O-ring 33 seals off the bore 12 between the mixing chamber 27 and the inlet bores 17 and 18, so that when the outlet ports 23 are positioned on the left of O-ring 33 and between O-rings 26 and 33, as shown in Figure 3, no water can enter the mixing chamber 27 and therefore, none is discharged from the faucet.

The volume of water dispensed from the faucet is controlled by moving the handle 43 forward and backward. When the handle is in its forwardmost position, the plunger 20 will be in its backwardmost position, and the outlet ports 23 will be in full communication with the mixing chamber 27. As a result, the faucet will be in its full "on" position. Since the outlet ports 23 discharge the water radially about the cylinder 20, there are no unbalanced axial or radial kinetic forces acting on the cylinder, and as a result, the cylindrical valve is hydrodynamically balanced. As the handle 43 is moved backwardly, the plunger 20 will move forwardly, and the outlet ports 23 will enter a partially closed position against O-ring 33. The amount of water dispensed from the faucet is controlled by regulating the area of the outlet ports 23 being closed-off by O-ring 33. The axial position of the cylindrical valve 20 is unaffected by the kinetic energy of the water passing therethrough, since it is hydrodynamically balanced, and once it is positioned it remains in that position until it is manually moved. When the handle 43 is in its backwardmost position, the plunger 20 is in its forwardmost position, and the outlet ports 23 are completely shut-off from the mixing chamber 27, whereby the faucet is in its fully closed position.

As is noted in both of the instances, as shown in Figures 2 and 3, the plunger or cylindrical valve 20 is hydrostatically balanced at all times. There is no pressure exerted on the outer ends of the cylinder valve 20 at any time, since the fluid is maintained in bore 12 between the O-rings 26 and 34 when in an open position, and between O-rings 26 and 33 when in a closed position. The O-rings therefore not only provide a floating valve chamber which is out of metal-to-metal contact with the walls of bore 12, but also limit the extent of fluid-flow within the bore 12 and prohibit any external endwise pressure on the valve. Fluid pressure on the inside of the chamber 24 of the cylindrical valve 20 is exerted in equal and opposite directions, so that the cylindrical valve 20 is in both a hydrostatic and hydrodynamic balanced condition at all times. Therefore, it is never necessary to overcome fluid pressure when opening or closing the valve 20, as is common in the presently known types of single lever control faucets, since the valve is hydrostatically balanced in its fully open position, partially closed position, and fully closed position.

As shown by Figures 4, 5 and 6, the temperature of the water delivered by the faucet by its nozzle or spout mounting portion 11 is controlled by rotating the handle 43 to the desired position. When the handle is rotated to the left, as shown by the left-hand center line in Figure 1, the valve 20 will be in a position, as shown in Figure 4, and cold water will be discharged through the spout mounted on portion 11. When the handle 43 is in its upright position, as shown in Figure 1, the cylindrical valve 20 will be in a position shown in Figure 5, and equal portions of hot and cold water will be discharged through the spout. When the handle 43 is rotated to the right, as shown by the right-hand center line of Figure 1, the cylindrical valve 20 will be in the position shown in Figure 6, and hot water will be discharged through the spout. The radial position of the cylindrical valve 20 is unaffected by the kinetic force of the water entering and passing through the valve, since the axially-aligned and radially-disposed inlet ports and the radially-disposed outlet ports within the hollow cylinder produce a hydrodynamically balanced cylindrical valve.

As shown in Figure 7, provision is made for limiting the rotational movement of the handle 43. An arcuate recess 10a of approximately 60 degrees is formed in a cylindrical back end portion of body member 10 adjacent the cap 37 and in communication with bore 12. A lug 37c attached to the cap 37 projects forwardly into the recess 10a. The recess is bounded by stop abutment surfaces 10b on its arcuately opposed sides. When the handle 43 is rotated, its movement is limited by lug 37c contacting stop abutment surfaces 10b, such as when the handle 43 is in its extreme left and right-hand positions, as indicated by the center lines in Figure 1.

Since both the hot and cold water sources are continually in communication with the bore 12 and chamber 24, it is advisable that a check valve be incorporated within each of the lines communicating with both the hot and cold water sources, in order to avoid cross flow. Normally the pressure within both the hot and cold water lines is equal and there is no cross flow. However, if the pressure within the hot and cold lines is unequal, then the line of higher pressure will be free to flow into the line of lower pressure, unless a check valve is provided. The ball valve 59 in each of the shanks 54 thus acts as a check valve and eliminates cross flow. The push rods 62 resting on the ball valves 59 prevent hammer action when initially opening the flow of water through the faucet. Both the weight of the push rod on the ball valves 59 and the fact that water becomes entrapped in the bore 63 above the rod, retard the upward movement of the ball valves and do not allow them to rise as rapidly, as they normally would, without these two factors opposing the surging incoming flow through inlet passageway 56 when the faucet is turned on.

The shank plug 64 may be screwed downwardly, so that it bears against the top of the push rod 62 and maintains the ball valve 59 in its seated position. This integral stop formed within the shank is extremely useful for rapidly and conveniently closing off water to the valve cylinder when it is desired to disassemble the faucet or make minor repairs thereon. The safety screw 71 prohibits one from accidently or inadvertently completely unscrewing the plug 64 from the bore 65, which could be disastrous, especially when the inlet passageway 56 is under pressure.

While a preferred embodiment of our invention has been shown and described, it is to be understood that the faucet structure shown is subject to modification within the spirit of the invention and the scope of the appended claims.

What we claim is:

1. A mixing faucet for controlling both the volume and temperature of water dispensed therefrom comprising, a body member, a bore formed within said member, means for connecting hot and cold water inlet conduits to said body member and forming axially aligned inlet passageways in radial communication with said bore, a hydrostatically and hydrodynamically balanced valve cylinder having a hollow portion positioned within said bore for longitudinal and rotational movement therewith, axially aligned and arcuately spaced-apart inlet ports formed radially-through said valve cylinder for selective alignment with said inlet passageways, a mixing and discharge passageway formed in said body member in radial communication with said bore, discharge ports formed radially-through said valve cylinder and communicable with said mixing and discharge passageway, sealing means within said bore between wall portions of said bore and said valve cylinder for maintaining fluid-flow within a portion of said bore and intermediate the ends of said valve cylinder, said sealing means maintaining said valve cylinder in a minute fluid-passable spatial relationship with wall portions of said bore, forming a fluid passage therebetween whereby the hollow portion of said valve cylinder will always be in at least a restricted communication with said inlet conduits through the minute fluid passage, and wherein fluid entering the bore and said valve cylinder will act equally and oppositely on said valve cylinder to maintain the cylinder in a hydrostatically and hydrodynamically-balanced condition, an O-ring within said bore intermediate said inlet passageways and said discharge passageway for sealing-off fluid flow therebetween within said bore, and means for rotating said valve cylinder to selectively align said inlet ports with said inlet conduits to obtain a desired water temperature and for longitudinally sliding said valve cylinder to obtain a desired discharge volume.

2. A device as defined in claim 1 wherein, said bore has a front and back end extending through said body member, a rotatable cap having a slot extending therethrough secured to said body by means of a retainer nut, an arcuate recess having stop abutment portions formed in said body member adjacent said rotatable cap, a lug formed on said rotatable cap positioned within said arcuate recess and engageable with said stop abutment portions to limit the rotational movement of said valve cylinder, a bar extension on said valve cylinder projecting outwardly through said slot, a projection extending upwardly from said cap, and a handle pivotally secured to said projection and said bar.

3. A single lever control mixing faucet for controlling both the volume and temperature of water dispensed therefrom comprising, a body member, a bore formed within said member, said bore having a front end portion and a back end portion which extend through opposite ends of said body member, inlet passageways extending through said body member communicating radially with said bore in opposed axial alignment adjacent its front end portion, a mixing and discharge passageway formed within said body member in communication with said bore adjacent its back end portion, a hollow valve cylinder positioned within said bore for longitudinal and rotational movement therein, arcuately spaced-apart and axially aligned inlet ports formed through cylindrical wall portions of said valve cylinder for selective alignment with said inlet passageways, arcuately spaced-apart discharge ports formed within wall portions of said valve cylinder longitudinally spaced-apart from said inlet ports and communicable with said discharge passageway, said valve cylinder having a hollow portion communicating between said inlet ports and said discharge ports, means for sealing-off fluid-flow in said bore between said discharge passageway and the back end portion of said bore, means for sealing-off fluid-flow within said bore between said inlet passageways and said front end portion, means for sealing-off fluid-flow within said bore between said inlet passageway and said discharge passageway, said sealing means maintaining said valve cylinder in a minute fluid-passable spatial relationship with wall portions of said bore to maintain said hollow portion in at least a restricted communication with said inlet passageways at all times so that fluid pressure will constantly act equally and oppositely in all directions within the valve cylinder to maintain it in a hydrostatically and hydrodynamically balanced condition, means for longitudinally sliding said valve cylinder within said bore to open and close-off fluid-flow through said discharge passageway and for rotating the cylinder therein to selectively position said inlet ports in alignment with said inlet passageways, and means for limiting the arcuate rotation of said valve cylinder within the bore.

4. In a single lever control mixing faucet construction for controlling both the volume and temperature of water dispensed therefrom having a longitudinal bore formed in a valve body with axially aligned hot and cold water inlet passageways and an outlet passageway communicating radially with the bore, hollow valve cylinder means within the bore for selectively controlling the amount of hot and cold water simultaneously delivered from said faucet, and said valve cylinder means having equal and opposite longitudinal fluid pressure reaction areas in constant communication with substantially identical fluid pressures independently of the position of said valve cylinder, means to provide a hydrostatically balanced valve cylinder means when it is in a closed position and a hydrodynamically balanced valve cylinder means when it is in an open position.

5. A mixing faucet for simultaneously controlling the volume of discharge of each of a plurality of fluids entering the faucet comprising, a body member, a bore within said member, a plurality of axially-aligned fluid inlets communicating with said bore, a hollow valve cylinder slidably and rotatably retained within said bore, said valve cylinder having equal and opposite fluid-pressure-responsive areas in constant communication with equal fluid pressures independently of the position of said valve cylinder for hydrostatically and hydrodynamically balancing said valve cylinder, a discharge passageway radially communicating with sidewall portions of said bore intermediate the longitudinal ends of said hollow valve cylinder, inlet port means formed radially through said valve cylinder communicating with said axially aligned fluid inlets, radially-extending outlet ports within said valve cylinder movable for axial alignment with said radially communicable discharge passageway, sealing ring means for maintaining a fluid seal between portion of said valve cylinder and wall portions of said bore, and means for operating said valve cylinder to selectively control the discharge from each fluid inlet.

6. A mixing faucet for selectively controlling the amount of discharge of each of a plurality of fluids in communication with the faucet comprising, a cylindrical body portion having a longitudinally-extending bore, axially-aligned inlet means communicating radially with said bore, discharge means radially communicating with side wall portions of said bore, a hollow plunger positioned within said bore for both longitudinal and rotational movement therein, arcuately-extending inlet port means formed radially through wall portions of said hollow plunger and positioned for selective alignment with said inlet means, radially-extending outlet portions formed in said hollow plunger movable for axial alignment with said radially-communicable discharge means, a hollow chamber within said plunger communicating with said inlet port means and said outlet portions, substantially equal and opposite fluid-pressure reaction area means on said plunger in constant communication with equally opposing fluid pressures for hydrostatically balancing said plunger when in a closed position and hydrodynamically balancing said plunger when in an open position, means adjacent said discharge means for providing a fluid tight seal between said plunger and wall portions of said bore independently of the position of said plunger within said bore, and means for operating said plunger to selectively control the amount of each fluid discharged from said faucet.

7. A device as defined in claim 6 wherein said fluid-tight sealing means comprises a plurality of O-rings positioned within said bore with at least one stationary O-ring positioned between wall portions of the bore and said plunger intermediate the inlet means and discharge means to constantly seal-off fluid-flow therebetween.

8. In a single lever control faucet for selectively mixing and controlling the discharge volume of each of a plurality of individual fluids, a housing body having a longitudinally-extending bore, axially-aligned fluid inlet portions communicating radially with said bore, a discharge passageway communicating radially with said bore, a hollow valve cylinder positioned within said bore for both rotative and longitudinal movement therein, said valve cylinder having balanced fluid-pressure reaction areas in constant communication with substantially identical fluid pressures independently of the position of said valve cylinder wherein endwise fluid pressure areas in one direction are substantially equal to the endwise fluid pressure areas in the opposite direction, inlet port means formed radially through side wall portions of said valve cylinder for selective alignment with said inlet portions, radially-extending discharge ports in said valve cylinder axially spaced-apart from said inlet port means and movable for axial alignment with said radially communicable discharge passageway, means for preventing an axial discharge flow of fluids between end portions of said valve cylinder and wall portions of said bore independently of the position of said valve cylinder, and means for selectively operating said valve cylinder to regulate the amount of discharge from each inlet portion.

9. A device as defined in claim 8 wherein means constantly seals-off fluid-flow between the exterior of said valve cylinder and wall portions of said bore intermediate said inlet portions and said discharge passageway comprising a stationary O-ring positioned within a recess formed in said bore between said inlet portions and said discharge passageway and held in compression between wall portions of the recess and said valve cylinder.

10. A single lever faucet for controlling both the volume and temperature of water dispensed therefrom comprising, a body member having a longitudinally-extending bore, axially-aligned hot and cold water inlets radially communicating with said bore, a radially-extending discharge outlet axially spaced from said inlets and communicating radially with side wall portions of said bore, a hollow valve cylinder slidably positioned within said bore for longitudinal and rotational movement therein, arcuately-extending inlet port means formed radially through side wall portions of said valve cylinder and communicating with said inlets, discharge outlet ports formed radially through side wall portions of said valve cylinder axially spaced from said inlet port means and axially-alignable with said discharge outlet, a hollow cylindrical portion of said valve cylinder communicating with said inlet port means and said outlet ports, sealing ring means positionable between wall portions of said bore and sidewall portions of said valve cylinder for preventing an axial outward discharge flow of water therebetween independently of the position of said valve cylinder and for preventing unbalanced external endwise forces on said valve cylinder, said cylinder having balanced fluid pressure reaction area means for hydrostatically and hydrodynamically balancing said valve cylinder, sealing means positioned within said bore intermediate said inlets and outlet in constant sealing compression between wall portions of said bore and said valve cylinder independently of the position of said valve cylinder for permanently sealing-off fluid flow within said bore exteriorly of said valve cylinder between said inlets and said discharge outlet and for selectively sealing-off fluid flow through said hollow cylindrical portion.

11. In a mixing faucet construction having a cylindrical body portion, a bore formed in the body portion, and axially aligned inlet passageways and an outlet passageway in radial communication with the bore; a hollow valve cylinder positioned within said bore with a minute spatial relationship between wall portions of said bore and said valve cylinder, said valve cylinder having equally opposed fluid pressure responsive areas, means for maintaining identical fluid pressures on said opposed fluid pressure responsive areas, said valve cylinder having a hollow interior portion in constant communication with said inlet passageways and communicable between said inlet passageways and said outlet passageway, means for rotating and longitudinally sliding said valve cylinder within said bore, means for maintaining said valve cylinder in said minute spatial relationship with wall portions of said bore and for confining fluid flow entering said minute spatial relationship from being discharged outwardly of the faucet axially between end portions of said valve cylinder and wall portions of said bore independently of the position of said valve cylinder.

References Cited in the file of this patent

UNITED STATES PATENTS

| | | |
|---|---|---|
| 1,846,624 | Volk | Feb. 23, 1932 |
| 1,872,626 | Ernst | Aug. 16, 1932 |
| 1,918,544 | House | July 18, 1933 |
| 2,360,733 | Smith | Oct. 17, 1944 |
| 2,471,725 | Clifford | May 31, 1949 |
| 2,527,836 | Miller | Oct. 31, 1950 |
| 2,556,780 | Shryock | June 12, 1951 |
| 2,642,262 | Johnson | June 16, 1953 |
| 2,684,691 | Strickler | July 27, 1954 |
| 2,749,941 | Gardner | June 12, 1956 |
| 2,943,792 | Moen | July 5, 1960 |

UNITED STATES PATENT OFFICE

CERTIFICATION OF CORRECTION

Patent No. 2,977,988                          April 4, 1961

Martin E. Drobilits et al.

It is hereby certified that error appears in the above numbered patent requiring correction and that the said Letters Patent should read as corrected below.

Column 7, line 44, after "cylinder" strike out the comma; lines 66 and 67, for "portion" read -- portions --.

Signed and sealed this 22nd day of August 1961.

(SEAL)
Attest:

ERNEST W. SWIDER                              DAVID L. LADD
Attesting Officer                                   Commissioner of Patents